United States Patent [19]

Engelhardt et al.

[11] Patent Number: 5,723,523
[45] Date of Patent: Mar. 3, 1998

[54] RUBBER COMPOSITION FOR A RADIAL TIRE HAVING IMPROVED PROCESSABILITY AND ADHESIVE STRENGTH

[75] Inventors: Martin L. Engelhardt, Hudson, Ohio; Kyung-Kyu Kang, Taejon, Rep. of Korea

[73] Assignee: Hankook Tire Mfg., Co., Ltd., Seoul, Rep. of Korea

[21] Appl. No.: 651,549

[22] Filed: May 22, 1996

[51] Int. Cl.$^6$ ............................................. C08K 5/34
[52] U.S. Cl. ............................................. 524/100
[58] Field of Search ................................. 524/100

[56] References Cited

U.S. PATENT DOCUMENTS

| | | | |
|---|---|---|---|
| 4,069,380 | 1/1978 | Crawford et al. | 544/212 |
| 4,338,263 | 7/1982 | Elmer | 260/762 |
| 4,391,318 | 7/1983 | Maxey | 152/359 |
| 4,436,853 | 3/1984 | Schloman, Jr. | 524/91 |
| 4,550,147 | 10/1985 | Oohara | 525/332.6 |
| 4,826,925 | 5/1989 | Ozawa | 525/331.8 |
| 4,947,916 | 8/1990 | Ishikawa et al. | 152/536 |
| 5,196,464 | 3/1993 | Shinoda | 524/100 |
| 5,226,987 | 7/1993 | Matsumoto et al. | 152/209 |
| 5,243,047 | 9/1993 | Lawson | 544/198 |
| 5,268,402 | 12/1993 | Daio et al. | 524/100 |
| 5,298,539 | 3/1994 | Singh et al. | 524/92 |

FOREIGN PATENT DOCUMENTS

| | | |
|---|---|---|
| 0104132 | 3/1984 | European Pat. Off. |
| 0125373 | 11/1984 | European Pat. Off. |
| 0305190 | 3/1989 | European Pat. Off. |
| 0473948 | 3/1992 | European Pat. Off. |
| 0492708 | 7/1992 | European Pat. Off. |
| 0492708 | 5/1996 | European Pat. Off. |

*Primary Examiner*—Edward J. Cain
*Attorney, Agent, or Firm*—Finnegan, Henderson, Farabow, Garrett & Dunner

[57] ABSTRACT

A rubber composition for a radial tire comprising natural rubber or synthetic rubber, carbon black, insoluble sulfur and additives, comprising a modified melamine resin as a thermosetting resin to improve adhesive strength and a triazine compound as an adhesion promoter.

The rubber composition has excellent processability and adhesive strength.

2 Claims, No Drawings

RUBBER COMPOSITION FOR A RADIAL TIRE HAVING IMPROVED PROCESSABILITY AND ADHESIVE STRENGTH

FIELD OF THE INVENTION

The present invention relates to a rubber composition for a radial tire having improved processability and adhesive strength. More particularly, it relates to a rubber composition for a radial tire, comprising a modified melamine resin as a thermosetting resin in conjunction with a triazine compound as an adhesion promoter to improve rubber-to-metal adhesion and processing.

BACKGROUND OF THE PRIOR ART

When making radial tires including a steelcord, it is necessary to bond well a rubber coating on the steelcord having a brass layer. Steelcords for tires can be coated with a layer of brass, broke or many metal alloys, but usually they are coated with a layer of brass.

The brass layer of a steelcord provides a suitable material that can chemically react with a rubber compound during curing under a high temperature and high pressure.

Typically, an adhesive rubber coated on a steelcord comprises the rubber composition that is shown in Table 1.

TABLE 1

| Mixing step | Ingredient | Content | (unit: part by weight) Drop Temperature |
|---|---|---|---|
| 1st step | *NR or *IR | 100.0 | |
| | carbon black | 55.0 | |
| | zinc oxide | 8.0 | 150° C. |
| | stearic acid | 0.5 | |
| | antioxidant | 2.0 | |
| | cobalt salt | 1.0 | |
| 2nd step | Vulkacit DZ | 0.7 | |
| | Insol. Sulfur(20% oil) | 8.0 | 100° C. |
| | Total | 175.2 | |

*NR: Natural Rubber
*IR: Isoprene Rubber

In the rubber composition of Table 1, the relatively high level of sulfur reacts with copper and zinc in the brass coating layer of the steelcord to form a bonding layer between the steel and the rubber. It is known that the use of cobalt salts helps to regulate a rate of growth and a composition of the copper sulfide and zinc sulfide layers.

While providing good initial adhesion, the rubber composition in Table 1 is deficient under long-term aging in a humid environment. Thus, when a tire tread is damaged by a stone or nail during service so that moisture is allowed to come in contact with the steel in the tire, there is a loss of adhesion of rubber to the steelcord which causes a separation in the tire.

In order to solve the above described problem, ways have been found to improve adhesive strength in the moisture and humidity aging. It has become common to use either resorcinol or resorcinol-formaldehyde(RF) resin together with a methylene donor, such as hexamethoxymethylmelamine (HMMM) or pentamethoxymethylmelamine(PMMM), to form a protective resin coating within the rubber compound that protects against the loss of adhesion during exposure to moisture.

The above described rubber has the composition shown in Table 2 and is made by mixing each ingredient.

TABLE 2

| Mixing Step | Ingredient | Rubber Composition(1) | Rubber Composition(2) | (unit: part by weight) Drop temperature |
|---|---|---|---|---|
| 1st step | natural rubber | 100.0 | 100 | |
| | carbon black | 55.0 | 55.0 | |
| | zinc oxide | 8.0 | 8.0 | 150° C. |
| | stearic acid | 0.5 | 0.5 | |
| | antioxidant | 2.0 | 2.0 | |
| | cobalt salt | 1.0 | 1.0 | |
| 2nd step | resorcinol | 2.0 | | |
| | RF resin | | 2.0 | 125° C. |
| 3rd step | Vulkacit DZ | 0.7 | 0.7 | |
| | insol. Sulfur (20% oil) | 7.0 | 7.0 | 100° C. |
| | HMMM | 1.5 | 1.5 | |
| | Total | 177.7 | 177.7 | |

It is an inevitable problem that the addition of resorcinol or RF resin typically requires an additional mixing step in the middle of the temperature that is used for the first and last mixing steps.

In the case of resorcinol, the mixing temperature should be high enough to fully incorporate, yet low enough to minimize volatilization of resorcinol. In the case of RF resin, the mixing temperature should be high enough to fully incorporate, yet low enough to prevent further condensation reaction which would raise the viscosity of the compound in use.

All of rubber compositions 1 and 2 shown in Table 2 provide excellent long-term adhesive strength under a variety of aging condition, but they present difficulties during processing.

Moreover, if the rubber composition containing resorcinol of Table 2 is used resorcinol fumes are emitted from it at the temperature which is usually used for tire production and the related industries(100° to 110° C.) and these fumes are harmful to factory worker's health.

In the case of the rubber composition using RF resin in Table 2, resorcinol fumes may be reduced but there is another problem during processing. The rate of processing needs to be decreased in order to maintain a suitable processing temperature since RF resin causes the viscosity of the rubber to increase as the temperature is elevated in a rubber processing or pressing with steelcord. As a result, productivity is reduced.

In addition, another problem on the mixing of RF resin is that the property of RF resin to stick to the processing apparatus resulting in a delay in productivity.

It is the object of the present invention therefore to provide a rubber composition for a radial tire having excellent rubber-to-steelcord adhesive strength under a wide variety of aging conditions without using resorcinol or RF resin, so that the processability thereof will be improved thereby.

SUMMARY OF THE INVENTION

The present invention relates to a rubber composition for a radial tire comprising natural rubber or synthetic rubber, carbon black insoluble sulfur and other additives, characterized in that the composition comprises a modified melamine resin as a thermosetting resin, which is obtained by esterification of methanol and partially alkylated melamine by which melamine reacts with nonstiochiometrically formaldehyde, and triazine compound as an adhesion promoter.

DETAILED DESCRIPTION OF THE INVENTION

According to present invention, the rubber composition for a radial tire comprises natural rubber(NR) or a mixture of NR and synthetic rubber, carbon black, insoluble sulfur and other additives, to which is added a modified melamine resin as a thermosetting resin to improve adhesive strength and a triazine compound as an adhesive promoter. The rubber composition for a radial tire according to the present invention does not use resorcinol or RF resin which is troublesome in processing, and the rubber composition has excellent processability and adhesive strength in comparison with conventional ones.

The modified melamine resin used in the present invention is a derivative of hexamethoxymethlymelamine (HMMM) used in a conventional rubber composition for radial tire, which is derived from the following reaction;

1st step: Production of alkylated melamine

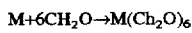

wherein M is melamine, $Ch_2O$ is formaldehyde.

2nd step: Esterification of the alkylated melamine with methanol

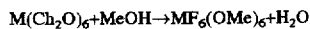

wherein M is melamine,

F is alkyl originating from formaldehyde,

OMe is methoxy and $MF_6(OMe)_6$ is HMMM.

In the above reaction steps, if 1 mole of melamine is reacted nonstoichiometrically with 6 moles or less of formaldehyde, imine groups remain that react with partially alkylated melamine in a condensation reaction to form an oligomer. The partially alkylated melamine is referred to as "high imino". The partially alkylated melamine can also be esterified to various amounts with methanol. As a result, a modified melamine derivative of the formula(I) is obtained which provides remarkably good adhesion to steelcord even without resorcinol or RF resin.

$$MF_a(OMe)_b \quad (I)$$

wherein M is melamine,

F is an alkyl group originating from formaldehyde,

OMe is a methoxy group, a is 2.5 to 4.0, and b is 0.5a±0.5

Preferably, the compound of the formula(I) is represented by the most preferable $MF_{3.4}(OMe)_{1.6}$.

The present inventor have found that this modified melamine resin should be used in conjunction with adhesion promoter to provide good adhesion to brass-coated steelcord.

An adhesion promoter used in the present invention includes a triazine compound, such as 2-chloro-4,6-bis(N-phenyl-p-phenylenediamino)-1,3,5-triazine or 2-chloro-4,6-dianilino-1,3,5-triazine.

According to the present invention, the modified melamine resin should be used together with a triazine compound in the robber composition. When the modified melamine resin is used alone without triazine, the amount of the rubber remaining on the steelcord after being pulled out of the rubber is not adequate. When triazine is used alone without the modified melamine, the remaining robber is adequate but the dynamic modulus of the rubber is decreased. When the modified melamine is used with triazine as adhesion promoter, good rubber-to-brass adhesion and the remaining rubber are provided over aging conditions.

The present invention will now be described in detail with respect to the following examples which are not intended to limit the scope of the present invention.

EXAMPLE

TABLE 3

(unit: part by weight)

| Ingredient | A | B | C | D | E | F | G |
|---|---|---|---|---|---|---|---|
| 1st step. natural Rubber | 100 | 100 | 100 | 100 | 100 | 100 | 100 |
| carbon black | 50 | 50 | 50 | 50 | 50 | 50 | 50 |
| zinc oxide | 8 | 8 | 8 | 8 | 8 | 8 | 8 |
| stearic acid | 0.3 | 0.3 | 0.3 | 0.3 | 0.3 | 0.3 | 0.3 |
| antioxidant | 2.4 | 2.4 | 2.4 | 2.4 | 2.4 | 2.4 | 2.4 |
| cobalt salt | 1 | 1 | 1 | 1 | 1 | 1 | 1 |
| 2nd step. carbon black | 12 | 12 | 12 | 12 | 12 | 12 | 12 |
| zinc oxide | 2 | 2 | 2 | 2 | 2 | 2 | 2 |
| 2-chloro-4,6-bis(N-phenyl-p-phenylenediamino-1,3,5-triazin | 1 | — | — | — | — | 2 | — |
| 2-chloro-4,6-dianilino-1,3,5-triazin | — | 1 | — | — | — | — | — |
| 3rd step. RF resin | — | — | 2 | — | — | — | — |
| 4th step insoluble sulfur(20% oil) | 7 | 7 | 7 | 7 | 7 | 7 | 7 |
| accelerator(DZ) | 0.8 | 0.8 | 0.8 | 0.8 | 0.8 | 0.8 | 0.8 |
| HMMM | — | — | 1.4 | — | — | — | — |
| $MF_{3.4}(OMe)_{1.6}$ | 1.4 | 1.4 | — | 1.4 | 2.5 | — | — |

Rubber compositions A and B represent examples of the present invention.

Rubber composition C is an example of a RF resin/HMMM adhesive system, which is mixed by an additional mixing step.

Rubber compositions D and E comprises a modified melamine without the triazine compound as an adhesion promoter.

Rubber composition F comprises triazine compound without the thermosetting melamine resin.

Rubber composition G is a 'blank' in which there is no RF resin, HMMM or melamine.

Test

The rubber compositions in Table 3 were mixed in a 1.6 liter internal mixer. After mixing the 4th step, the rubber was sheeted out on a lab mill and test specimens are prepared.

Adhesion Test

The prepared specimens were adhered to steelcord, cured and the steel cord then pulled out. The adhesive strength of the specimen and steelcord is determined by ASTM D2229. The amount of rubber remaining on the steelcord after being pulled out and the maximum force required to pull out the steelcord are shown in Table 4

Determination of Dynamic viscoelastic properties

Dynamic viscoelastic properties of the above rubber specimens in, before and after curing were measured by a programmable mechanical spectrometer(Model; RPA 2000 manufactured by Flexsys Corporation) with a biconical die. A stepwise test program was used for the rubber specimens in order to evaluate viscosity in an uncured state as an indication of processability, a cure rate and cured dynamic storage and loss modulus after curing under the protocol outlined as below. Repeated strain sweeps might be used when measuring cured samples. The results are shown in Table 5

RPA2000 Test Condition

| Measurement | Temperature (°C.) | Strain (%) | Frequency (Hz) | Time (min) |
|---|---|---|---|---|
| Viscosity uncured | 100 | 15 | 8.3 | — |
| Curing condition (cure rate, etc.) | 150 | 0.7 | 1.7 | 30 |
| Properties after curing 1st sweep | 80 | 1 to 14 | 11 | — |
| Properties after curing 2nd sweep | 80 | 1 to 14 | 11 | — |

TABLE 4

| | Maximum force in kg(coverage %) | | | | | | |
|---|---|---|---|---|---|---|---|
| | A | B | C | D | E | F | G |
| unaged, cure 30 min, 150° C. | 94 (97) | 95 (98) | 81 (95) | 85 (98) | 77 (80) | 90 (100) | 71 (95) |
| overcured, cure 80 min, 160° C. | 83 (99) | 81 (98) | 77 (99) | 81 (98) | 63 (50) | 89 (100) | 72 (90) |
| cure 30 min @ 150° C., 3 weeks @ 70° C., 95% RH | 77 (95) | 84 (100) | 68 (77) | 76 (90) | 54 (60) | 66 (90) | 78 (98) |
| uncure 3 weeks @ 40° C., 95% RH cure 30 min @ 150° C. | 69 (97) | 60 (65) | 72 (94) | 55 (95) | 77 (90) | 72 (70) | 50 (80) |

(coverage %): The rubber remaining on the wire after being pulled out rubber.

TABLE 5

| Dynamic Properties from RPA2000 | | | | | | | |
|---|---|---|---|---|---|---|---|
| | | | | | | (unit: kPa) | |
| | A | B | C | D | E | F | G |
| uncure G* @ 100° C., 15%, 8.3Hz | 430 | 440 | 420 | 440 | 420 | 370 | 400 |
| cure G' @ 80° C., 11Hz | | | | | | | |

TABLE 5-continued

| Dynamic Properties from RPA2000 | | | | | | | |
|---|---|---|---|---|---|---|---|
| | | | | | | (unit: kPa) | |
| | A | B | C | D | E | F | G |
| (2nd sweep) | | | | | | | |
| 1% | 5900 | 5900 | 6000 | 5600 | 3900 | 4400 | 3400 |
| 2% | 4800 | 4800 | 5000 | 4700 | 3800 | 4100 | 2900 |
| 3% | 4200 | 4200 | 4300 | 4100 | 3600 | 3600 | 2600 |
| 5% | 3600 | 3600 | 3600 | 3500 | 3100 | 3000 | 2300 |
| 7% | 3200 | 3300 | 3300 | 3200 | 2900 | 2700 | 2200 |
| 10% | 2900 | 2900 | 3000 | 3000 | 2700 | 2300 | 2000 |

Uncured G*: It concerns with a fluidity of and die swell of rubber. A lower value is better for processability.
Cured G': It means resistance to a shear stress and a higher value is better result.

As shown in the above results, rubber compositions A and B in accordance with the present invention exhibit excellent adhesive strength to steelcord under a variety of aging conditions and also have a high dynamic modulus. The extra mixing step is not needed, since neither resorcinol nor RF resin is used in the rubber compositions A and B, so it was easy to prepare the rubber compound.

In the case of the rubber composition C which adds RF resin/HMMM to a rubber compound, its adhesive strength to steelcord is favorable when aged in a humid environment, either before cure(green) or after cure. The composition C, however, needs an extra mixing step to add resorcinol and the RF resin so that productivity was reduced.

The rubber compositions D and E which comprise the modified melamine resin without triazine compound represent a deficient adhesive strength to steelcord in humidity aging and they are poor in view of rubber coverage remaining on the steelcord after being pulled out.

The rubber composition F which comprises triazine compound without the modified melamine resin has an improved rubber coverage, but its cured dynamic modulus is deficient. High dynamic modulus is preferable in a rubber composition for radial tire, since it prevents an excessive movement of steelcord which could lead to socketing and loosening of bonds between rubber and steelcord in the use of tire.

As a result, a rubber composition of the present invention provides an excellent adhesive strength to steelcord under a variety of aging conditions and high dynamic modulus, and an improved processability due to excluding extra mixing step to add resorcinol or RF resin.

What is claimed is:

1. A rubber composition for a radial tire which comprises:

A) 100 parts by weight of natural rubber;

B) from 0.5 to 5 parts by weight of a modified melamine resin of the formula $$MF_a(OMe)_b$$

wherein M is melamine, F is an alkyl group, OMe is a methoxy group, a is 2.5 to 4.0 and b is 0.5a±0.5; and C) from 0.1 to 5 parts by weight of 2-chloro-4,6 dianilino-1,3,5 triazine or 2-chloro-4,6-bis (N-phenyl-p-phenylenediamino)-1,3,5 triazine.

2. The rubber composition of claim 4 wherein a is 3.4 and b is 1.6.

* * * * *